Patented Oct. 12, 1937

2,095,887

UNITED STATES PATENT OFFICE 2,095,887

TREATMENT OF CASEIN

William Howard Nicol, Cuyahoga Falls, Ohio, assignor to Wingfoot Corporation, Wilmington, Del., a corporation of Delaware No Drawing. Application July 5, 1935,
Serial No. 30,020

1 Claim. (Cl. 134—23.9)

This invention relates to the treatment of casein and more particularly to the preparation of casein for use in cements or adhesives.

A true aqueous solution of casein is desired for compounding with other ingredients in the preparation of certain adhesives, etc. It has been found that commercial grades of casein which are dried out to different degrees and aged for different lengths of time react differently toward alkalies. Particular care must therefore be taken to obtain from different batches of casein a solution which will have uniform physical and/or chemical properties. For example, in the preparation of adhesives, in which an alkaline medium is employed to make the casein soluble in water, care must be taken to produce a homogeneous aqueous solution. In using ammonia, for example, if the casein is not in a finely divided condition it will not entirely react with the ammonia to give water-soluble ammonium caseinate. With large particle size casein the ammonia or other water solubilizing compound may form a lumpy caseinate not entirely in solution.

According to this invention casein is ball milled with ammonia or other alkaline solubilizing compound to produce the caseinate solution which is then mixed with latex or other ingredients to form an adhesive. The dried casein, which may be composed of pieces dried to a different extent and aged for a different length of time, is subdivided to a size suitable for ball milling. For this purpose the casein is preferably reduced to 40 to 100 mesh. This is ball-milled with water for an hour. At the end of this time the casein has softened. Sometimes it swells in the water and at other times the mixture assumes a milk-like appearance. Then alkali is added, such as ammonia, and the ball milling is continued for preferably another hour. Preferably only part of the total water is added to the mill during the preliminary treatment, i. e., before the addition of the alkali, and the balance of the water is added at the same time as the alkali. This treatment gives a uniform caseinate regardless of the original state of the casein supplied to the mill. The dissolved caseinate thus obtained may be mixed with latex in any suitable proportions to make a good adhesive.

The grinding of the casein with water prior to the addition of alkali softens the casein. In this state it is readily acted on by the solubilizing agent. It will ordinarily be found desirable not to grind the casein for too long a period in this preliminary stage of the treatment.

The following example illustrates the process:

31.9 pounds of casein are ball milled with 318.8 pounds water for one hour, after which 133.9 pounds water and 19.1 pounds of concentrated ammonium hydroxide (28%) are added. This mixture is then ball milled for another hour during which time the casein reacts with the ammonia forming the water soluble ammonium caseinate. The solution is preferably effected at room temperature, i. e. without heating or cooling. A desirable adhesive is made by mixing the resulting solution with about 134 pounds of commercial concentrated latex of 60% rubber content. Neither the casein after wetting or after being brought into solution, nor the adhesive formed from the latex should be stored for any considerable length of time as the casein tends to spoil. Age resisters, and preservatives such as hydroquinone, sodium chloro phenyl phenate, and sodium ortho phenyl phenate may be used to prolong the time before spoilage commences.

According to another procedure about 28.2 pounds of pulverized casein is ball milled for one hour with 10.2 pounds of water. To this about 14.1 pounds of concentrated ammonia (containing 26 to 28% of $NH_3$) is added and the ball milling continued for another half hour. If this is to be used with latex it may be diluted with more water, for example enough to reduce the concentration of original casein present to $6\frac{2}{3}\%$.

Instead of ammonia, other alkalies such as diethanol amine, ethylene diamine, diethylene triamine, propylene diamine, diethylene tetramine, sodium carbonate, sodium hydroxide, borax and potassium hydroxide and the like may be employed to solubilize the casein for various different purposes. For the preparation of a casein-latex adhesive to be used to cement rubber to rayon in the manufacture of automobile tires, ammonia will, in general be found most satisfactory.

Various commercial forms of casein may be satisfactorily treated in this way, such as muriatic acid casein, coagulated caseins (low and high viscosities), rennet casein, lactic acid casein, and sulfuric-acid coagulated casein (medium and high viscosities).

Where the casein employed varies little in properties from batch to batch the time of ball milling prior to adding the alkali may be materially reduced and the time of ball milling after adding the alkali may be reduced. Where the source of casein is not uniform and the casein supplied to different batches varies to a considerable extent it will be found that by ball milling with water for about an hour and then adding alkali and again ball milling for about an hour, a product which is relatively uniform from one batch to the next will be obtained.

This is in part a continuation of co-pending application Serial No. 655,248 filed February 4, 1933.

I claim:

The method of preparing from dried pieces of casein, caseinate solutions suitable for use in adhesives which comprises reducing the casein to particles not larger than 40 mesh, ball milling said particles with about 10 parts by weight of water, for one hour until the mixture assumes a milk-like appearance, then continuing the ball milling with the addition of water and sufficient ammonia to convert the casein into caseinate and continuing the ball milling for about one hour until caseinate is formed.

WILLIAM HOWARD NICOL.